(12) United States Patent
Demangeot et al.

(10) Patent No.: US 10,857,495 B2
(45) Date of Patent: Dec. 8, 2020

(54) OIL SEPARATION DEVICE

(71) Applicant: MECAPLAST FRANCE, Clamart (FR)

(72) Inventors: Jérôme Demangeot, Calonne sur la Lys (FR); Philippe Gauquie, Leforest (FR); Christophe Maeseele, Lozinghem (FR)

(73) Assignee: NOVARES FRANCE, Clamart (FR)

( * ) Notice: Subject to any disclaimer, the term of this patent is extended or adjusted under 35 U.S.C. 154(b) by 57 days.

(21) Appl. No.: 15/537,751

(22) PCT Filed: Dec. 15, 2015

(86) PCT No.: PCT/FR2015/053500
§ 371 (c)(1),
(2) Date: Jun. 19, 2017

(87) PCT Pub. No.: WO2016/097573
PCT Pub. Date: Jun. 23, 2016

(65) Prior Publication Data
US 2018/0001245 A1    Jan. 4, 2018

(30) Foreign Application Priority Data

Dec. 19, 2014 (FR) ..................................... 14 62989

(51) Int. Cl.
*B01D 45/16* (2006.01)
*B01D 45/08* (2006.01)
*F01M 13/04* (2006.01)

(52) U.S. Cl.
CPC ............. *B01D 45/16* (2013.01); *B01D 45/08* (2013.01); *F01M 13/04* (2013.01); *F01M 2013/0422* (2013.01); *F01M 2013/0438* (2013.01)

(58) Field of Classification Search
CPC ........ B01D 45/16; B01D 45/08; F01M 13/04; F01M 2013/0438; F01M 2013/0422
See application file for complete search history.

(56) References Cited

U.S. PATENT DOCUMENTS 3,713,279 A * 1/1973 Moore .................. B01D 45/16
55/319
4,289,611 A * 9/1981 Brockmann .............. B04C 3/04
209/710

(Continued)

FOREIGN PATENT DOCUMENTS

CN          1925902       3/2007
CN        201043501       4/2008

(Continued)

OTHER PUBLICATIONS

International Search Report for Application No. PCT/FR2015/053500.

(Continued)

*Primary Examiner* — Joseph J Dallo
*Assistant Examiner* — Kurt Philip Liethen
(74) *Attorney, Agent, or Firm* — Cantor Colburn LLP

(57) ABSTRACT

This device is intended to separate oil droplets from a gas stream and comprises an inlet wall (2) having at least one inlet opening in which there is disposed a propeller for accelerating and radially orienting the gas stream and at least one retaining wall (3) having at least one retaining medium disposed facing a propeller (8). Advantageously, the inlet wall (2) and the retaining wall (3) are linked by a hinge allowing the retaining wall (3) to be folded against the inlet wall from an unfolded production configuration to a folded use configuration.

10 Claims, 5 Drawing Sheets

(56) References Cited

U.S. PATENT DOCUMENTS

| | | | | |
|---|---|---|---|---|
| 7,743,742 | B2* | 6/2010 | Wagner | F01M 13/04 123/41.86 |
| 8,048,212 | B2* | 11/2011 | Parikh | F01M 13/04 96/402 |
| 8,152,887 | B2* | 4/2012 | Patel | B01D 46/0005 123/198 E |
| 8,991,622 | B2* | 3/2015 | Schook | B04C 3/00 210/512.3 |
| 9,470,189 | B2* | 10/2016 | Ackermann | B01D 50/002 |
| 2009/0193770 | A1 | 8/2009 | Holzmann et al. | |
| 2013/0206675 | A1* | 8/2013 | Koslowski | B01D 29/58 210/335 |
| 2014/0283689 | A1 | 9/2014 | Guerry et al. | |

FOREIGN PATENT DOCUMENTS

| | | |
|---|---|---|
| CN | 102348871 | 2/2012 |
| CN | 104093945 | 10/2014 |
| DE | 102004037157 A1 | 3/2006 |
| DE | 202012002218 U1 | 3/2013 |
| DE | 202012005909 U1 | 6/2013 |
| GB | 888237 A | 1/1962 |
| WO | 200504916 A1 | 6/2005 |
| WO | 2010102687 A1 | 9/2010 |
| WO | 2010142544 A1 | 12/2010 |

OTHER PUBLICATIONS

First Examination Report for Application No. 201717024546.
English Machine Translation of CN1925902 Abstract.
English Machine Translation of CN102348871 Abstract.
English Machine Translation of CN201043501 Abstract.
English Machine Translation of CN104093945 Abstract.
Search Report Application No. 201580068776X.

* cited by examiner

OIL SEPARATION DEVICE

CROSS REFERENCE TO RELATED APPLICATIONS

This application is a National Stage of PCT Application No. PCT/FR2015/053500 filed on Dec. 15, 2015, which claims priority to French Patent Application No. 14/62989 filed on Dec. 19, 2014, the contents each of which are incorporated herein by reference thereto.

TECHNICAL FIELD

The present invention concerns a device for separating oil, intended to separate oil droplets from a gas flow, particularly for a combustion engine of a motor vehicle.

BACKGROUND

In the operation of an inner combustion engine, it may occur a mixing phenomenon of oil droplets in a gas flow.

Thus, an engine conventionally comprises a combustion chamber into which a gas mixture of fuel and air is admitted. In operation, it happens that a part of the combustion gases is infiltrated between the piston and the cylinder in the oil pan of the engine. These gases, called crankcase gases, can damage the engine. It is thus known to evacuate and reuse them by recycling them in the gas mixture. However, the evacuated crankcase gases are charged with suspended oil droplets collected in the crankcase. These oil droplets clog the elements of the engine crossed by the crankcase gases, in particular the air inlet line. Furthermore, they contribute to the oil consumption. Finally, taking into account the increasingly drastic anti-pollution standards, it has become necessary to purify the air entering the composition of the gas mixture by eliminating in particular the suspension oil droplets for the best possible combustion.

It is thus known from the patent documents EP 1 684 888 or WO 2010142544 to eliminate the oil droplets transported by the crankcase gases with an oil separation device allowing settling the oils droplets.

However, the known oil separation devices are complex to produce, in particular because of the large number of their components.

BRIEF SUMMARY

In this technical context, it is an object of the invention to propose an oil separation device which has an important capability for capturing oil droplets and which has a controlled production cost.

The invention concerns an oil separation device intended to separate oil droplets from a gas flow, comprising an inlet wall having at least one inlet orifice in which is disposed a helix allowing accelerating and orienting radially the gas flow and at least one retention wall having at least one retention media disposed opposite to a helix.

Thus, the invention provides a device producing an important oil droplet capture while including few parts and being space saving.

According to a preferred embodiment of the invention, the inlet wall and the retention wall are linked by a hinge allowing the retention wall to be folded over the inlet wall from an unfolded configuration of production to a folded configuration of use.

This disposition of the invention allows a particularly efficient manufacturing of the invention because the device as a whole can be produced by a single molding operation.

Advantageously, the inlet wall comprises a cylindrical wall delimiting an inlet orifice in which a helix is disposed, said helix having a central cone of which blades extend, the blades joining the cylindrical wall.

This characteristic of the invention allows carrying out the acceleration and the radial orientation of the flow, on the one hand, without a movable part and, on the other hand, in a reduced space requirement.

In an embodiment of the invention, the device comprises an intermediate wall interposed between the inlet wall and the retention wall, the intermediate wall having openings intended to be in alignment with at least one helix to direct the gas flow to the retention media.

Preferably, the intermediate wall is linked to the inlet wall by a hinge for simplification purpose of the manufacturing operations.

According to a possibility, the retention wall is solid.

According to another possibility, the retention wall has a recess.

In a variant, the retention media panel is disposed in the vicinity of retention wall.

In an embodiment of the invention, the retention wall has at least one cage into which a retention media is inserted, said cage being disposed in the axis of a helix when the device is in a folded configuration of use.

According to a possibility, the retention media has the shape of a cylinder of radial retention media inserted into the cage.

BRIEF DESCRIPTION OF THE DRAWINGS

For its good understanding, the invention is described with reference to the appended drawings showing, by way of non-limiting examples, several embodiments of oil separation devices according to the invention.

By convention, the elements of the invention which are found in different embodiments bear the same numerical references.

DETAILED DESCRIPTION

Figure 1:
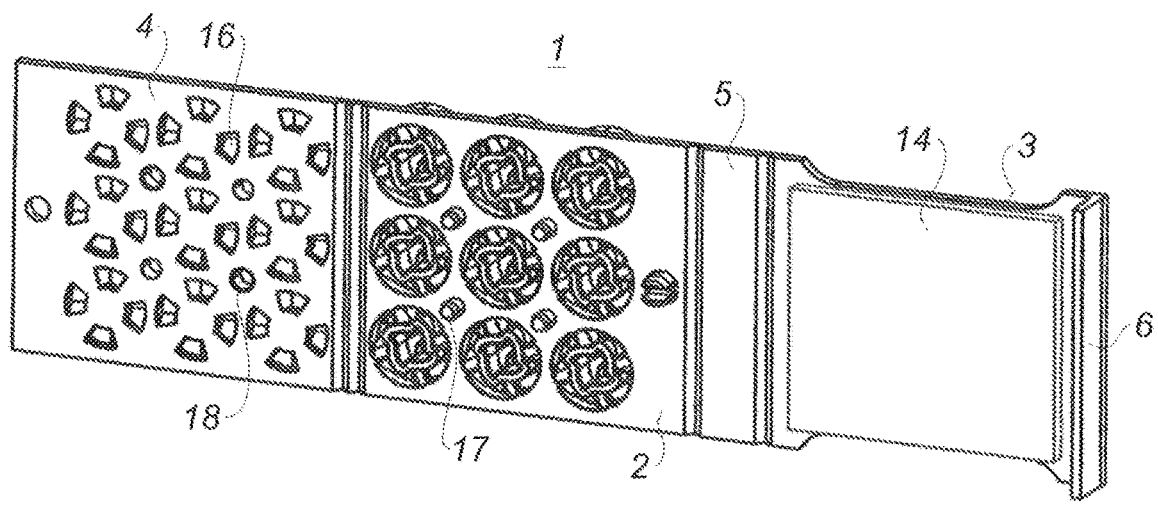
FIG. 1, shows in perspective a first embodiment of an oil separation device prior to its shaping

FIG. 1 shows in its unfolded configuration of production an oil separation device 1.

As visible in this figure, the separation device 1 according to the invention is in the shape of a unitary plastic element and includes essentially three portions linked in pairs.

In practice, the separation device 1 is made of molded plastic and can be obtained in a single molding operation.

At the center of the separation device 1 is located an inlet wall 2. On the other side of the inlet wall 2, the separation device 1 is equipped with a retention wall 3 and an intermediate wall 4. The retention 3 and intermediate 4 walls are linked to the inlet wall 2 by film hinges that is to say a bridge made of thinned material which allows the intermediate wall 4 and the retention wall 3 to pivot relative to the inlet wall 2. It should be noted that the retention wall 3 is linked to the inlet wall 2 by a strip made of material 5 itself linked to the retention wall 3 and to the inlet wall 2 by film hinges made of thinned material. As visible in FIGS. 1 to 5, the retention wall 3 is further provided with a material return 6.

The structural characteristics and functions of the different portions will appear below.

It can be perceived in FIGS. 1 to 5 that the inlet wall 2 is provided with nine helices 8 disposed, in this embodiment, in rows of three.

Within the meaning of the present document, helix means a fixed member allowing accelerating axially and radially an air flow of oil droplets with the aim of centrifuging the oil particles and causing their coalescence.

The inlet wall 2 is provided with inlet orifices 9 delimited by a cylindrical wall 10 within which a helix 8 is positioned. The helix 8 has a central cone 12 from which blades 13 extend, which join the cylindrical wall 10.

The intermediate wall 4 is provided with openings 16 which are disposed in the extension of the inlet orifices 9. The retention wall 3 is in the shape of a wall having a recess 15 (see FIGS. 1 to 3) or a solid wall (see FIGS. 4 and 5) on which a retention media panel 14 is disposed. The retention media is, for example, a media called coalescent media, that is to say it allows collecting oil droplets being suspended in an air flow. The retention media can comprise in particular a fiber-based porous material.

In practice, the separation device 1 is made by molding, the inlet wall 2, the retention wall 3 and the intermediate wall 4 being substantially in the extension of each other.

The retention media panel 14 is attached on the retention wall 3.

Figure 2:
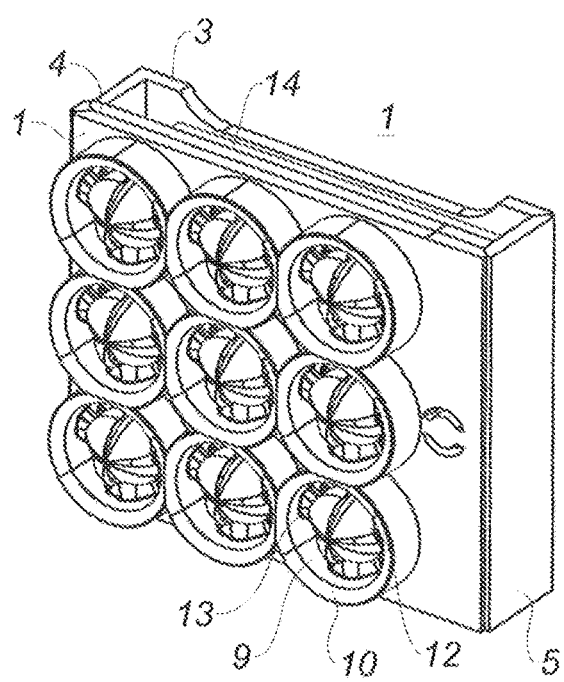
FIGS. 2 and 3 show in perspective the separation device of FIG. 1 in the configuration of use
Figure 3:
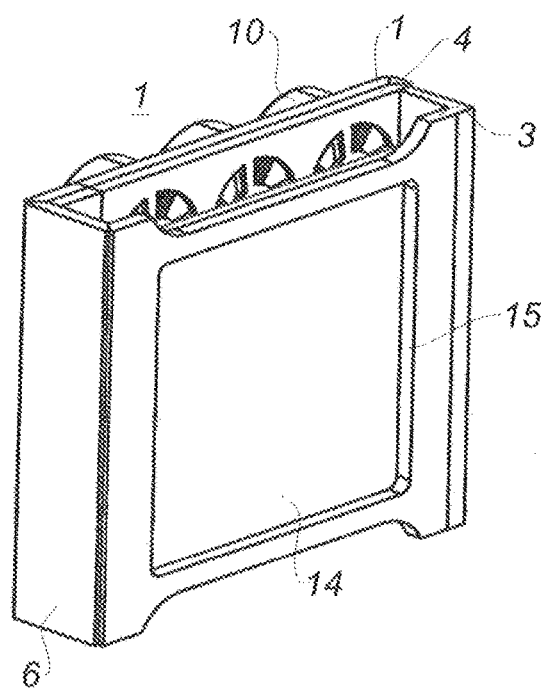
Figure 4:
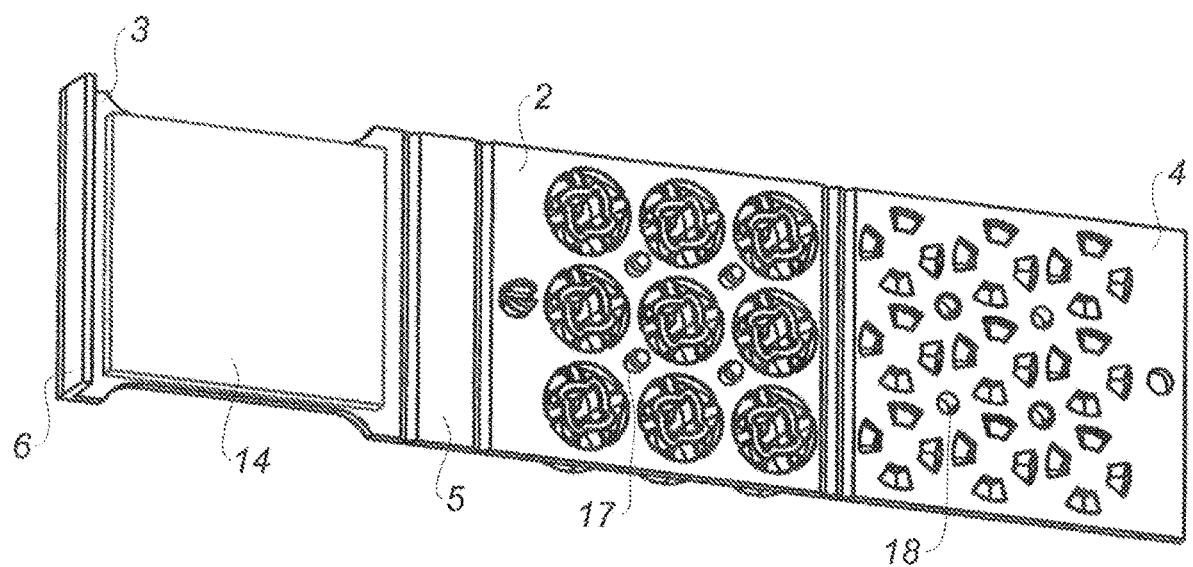
FIG. 4 shows in perspective a variant of an oil separation device 1 with oil prior to its shaping.
Figure 5:
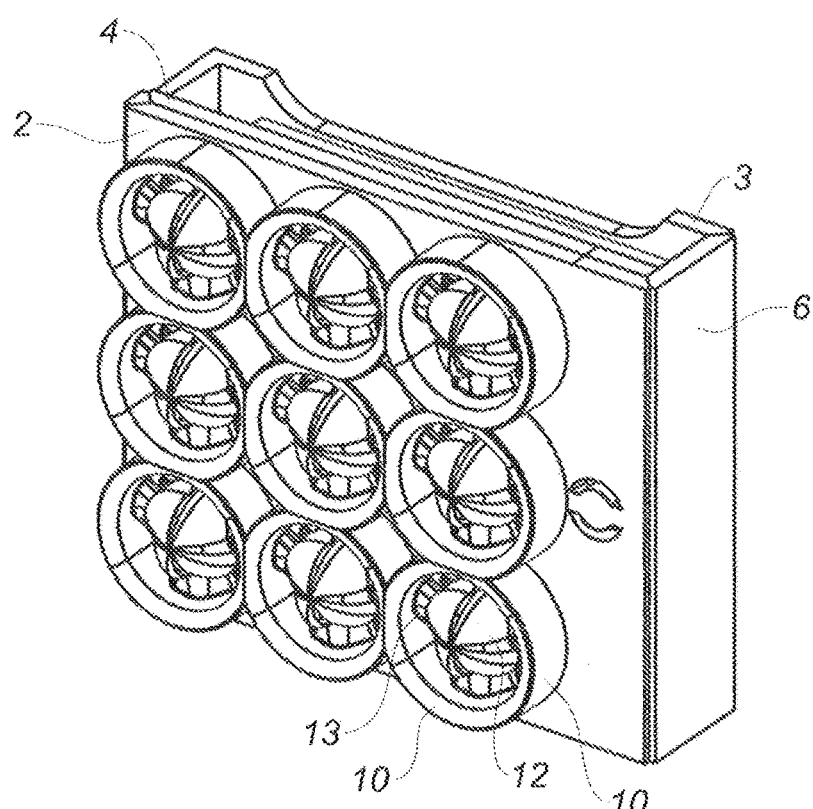
FIG. 5 shows a variant of an oil separation device in the configuration of use.

FIGS. 2 and 3 show the separation device 1 in its folded configuration of use. In this configuration, the intermediate wall 4 is folded over the inlet wall 2 and the retention wall 3 is folded over the intermediate wall 4. It is possible to expect that one of the walls is provided with pins 17 which are inserted into bores 18 formed in an adjacent wall to manage the proper positioning of the walls relative to each other.

It will thus be understood that the separation device 1 is assembled in an extremely simple manner. The assembly can be performed in a manual or robotic manner without requiring expensive installation.

The separation device 1 can be inserted into a heat engine to trap the oil droplets present in an air flow such as for example in a crankcase gas flow.

FIGS. 6 to 11 partially show another embodiment of a separation device 1 with an inlet wall 2 and a retention wall 3.

The inlet wall 2 is therefore equipped with a helix 8.

The inlet wall 2 is provided with inlet orifices 9 delimited by a cylindrical wall 10 within which is a helix 8 positioned. The helix 8 has a central cone 12 from which blades 13 extend.

The retention wall 3 is folded and is pressed against the inlet wall 2. The function of the retention wall 3 is to trap the oil droplets present in the gas flow.

The retention wall 3 has an opening 16 possibly bordered by a rib 17 and topped by a cage 19. As it will appear, the function of the cage 19 is to receive a retention media. For this, the cage 19 comprises spacers 21 which support a posterior face.

Figure 6:
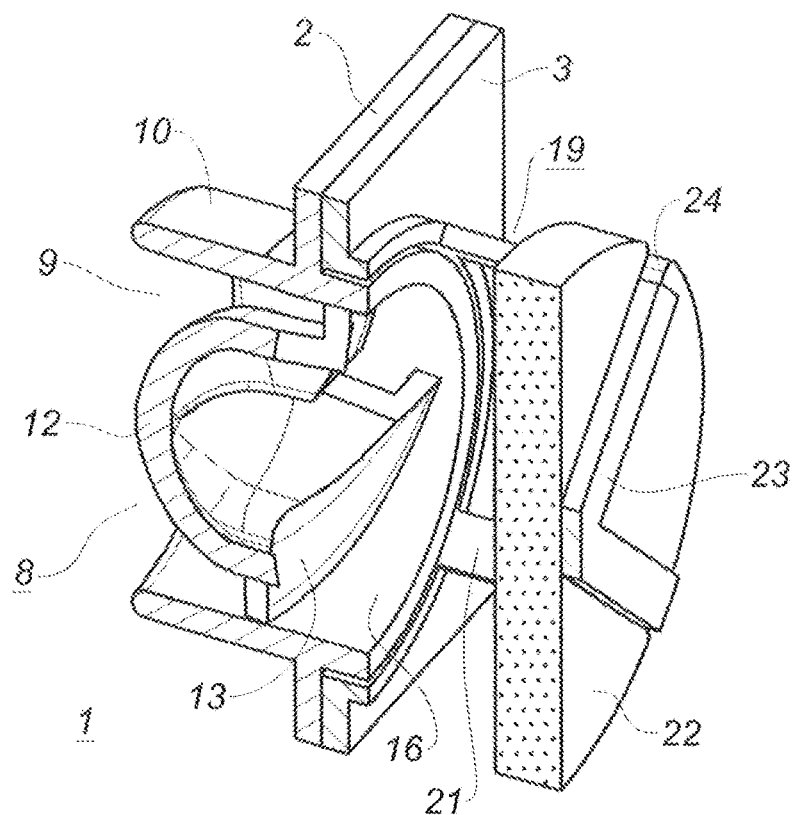
FIGS. 6 to 11 show in cross-section another embodiment of the invention in several variants.
Figure 7:
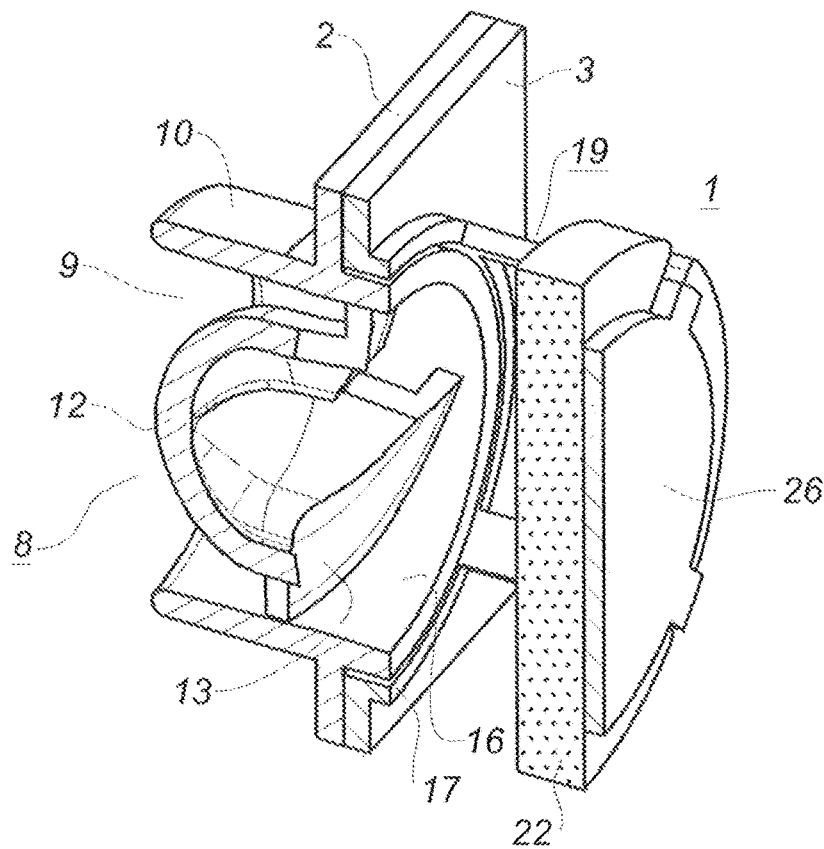

In the embodiments of FIGS. 6 and 7, the retention media is in the shape of a disk 22 positioned in a plane normal to the turbine axis.

In the embodiment of FIG. 6, the posterior face of the cage is constituted by a spider 23. The axial retention media disk 22 is accordingly blocked against the spider 23. The axial retention media disk 22 can be equipped, at its periphery with notches 24 in which the spacers 21 are engaged.

FIG. 7 shows a variant of the separation device 1 illustrated in FIG. 6 in which the axial retention media disk 22 is held by a wall 26 which forms the posterior wall of the cage 19. The wall 26 forms a bearing surface for the axial retention media disk 22.

Figure 8:
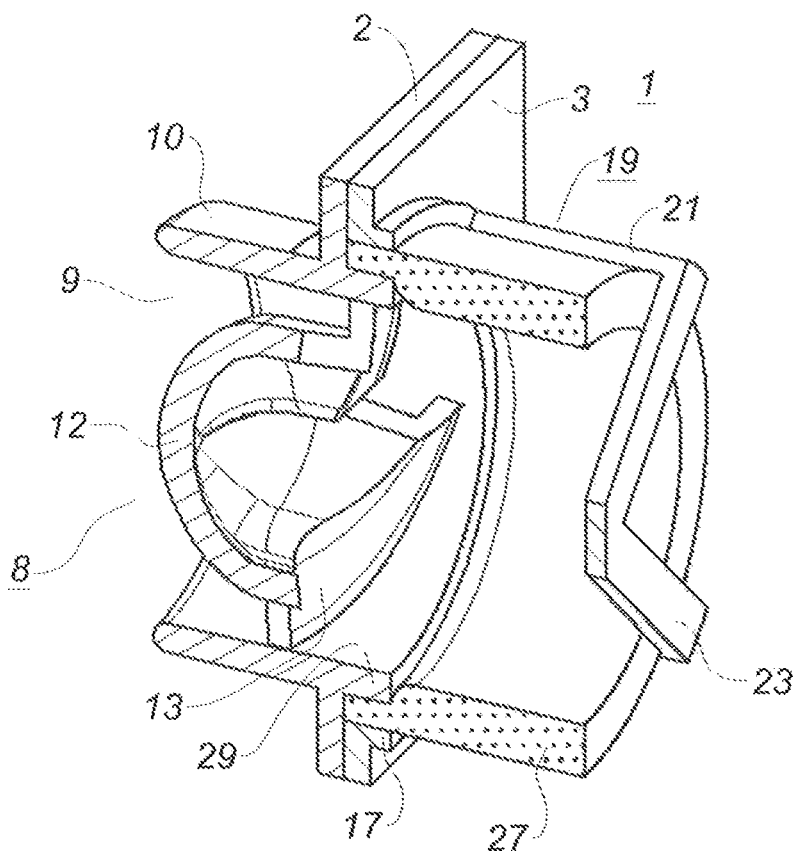
Figure 9:
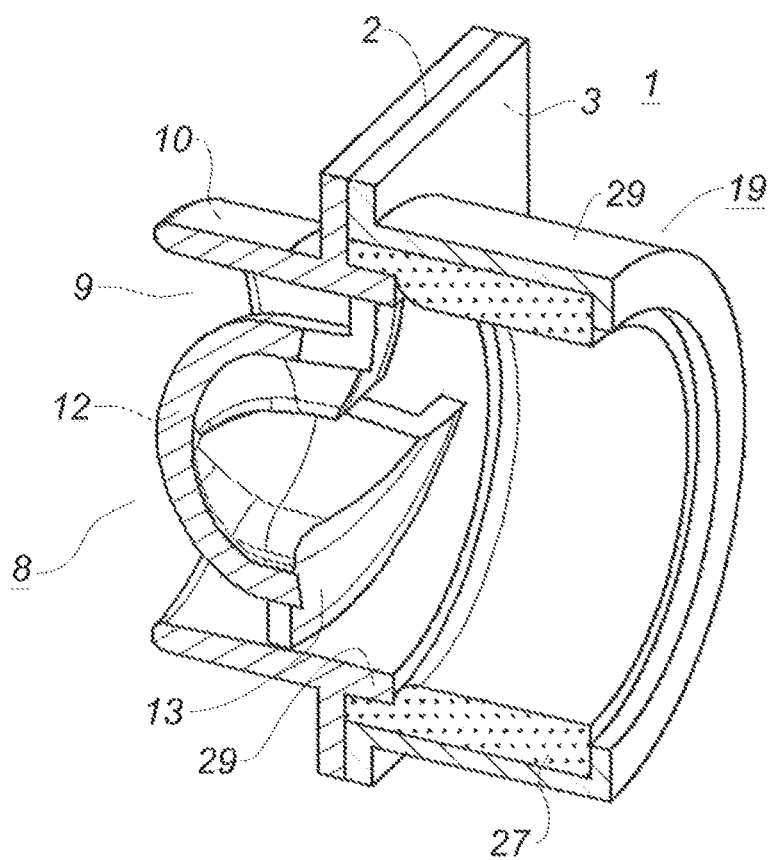

FIGS. 8 and 9 illustrate two variants in which the separation device 1 is equipped with a radial retention media.

As shown in these Figures, the separation device 1 is equipped with a cylinder of radial retention media 27. The cylinder of radial retention media 27 is interposed between the inlet wall 2 and the retention wall 3. In practice, the cylinder of radial retention media 27 is clamped between a rib 29 coming from the inlet wall 2 and the rib 17 of the retention wall 3. The cylinder of radial retention media 27 has a height substantially equal to the height of the spacers 21 of the intermediate wall 4.

In a variant illustrated in FIG. 9, the cylinder of radial retention media 27 is encapsulated in a cylinder 29 made of plastic which comes from the intermediate wall 4. In this variant, the cylinder 29 made of plastic material delimits a posterior opening through which flows the air flow cleared of its oil droplets.

Figure 10:
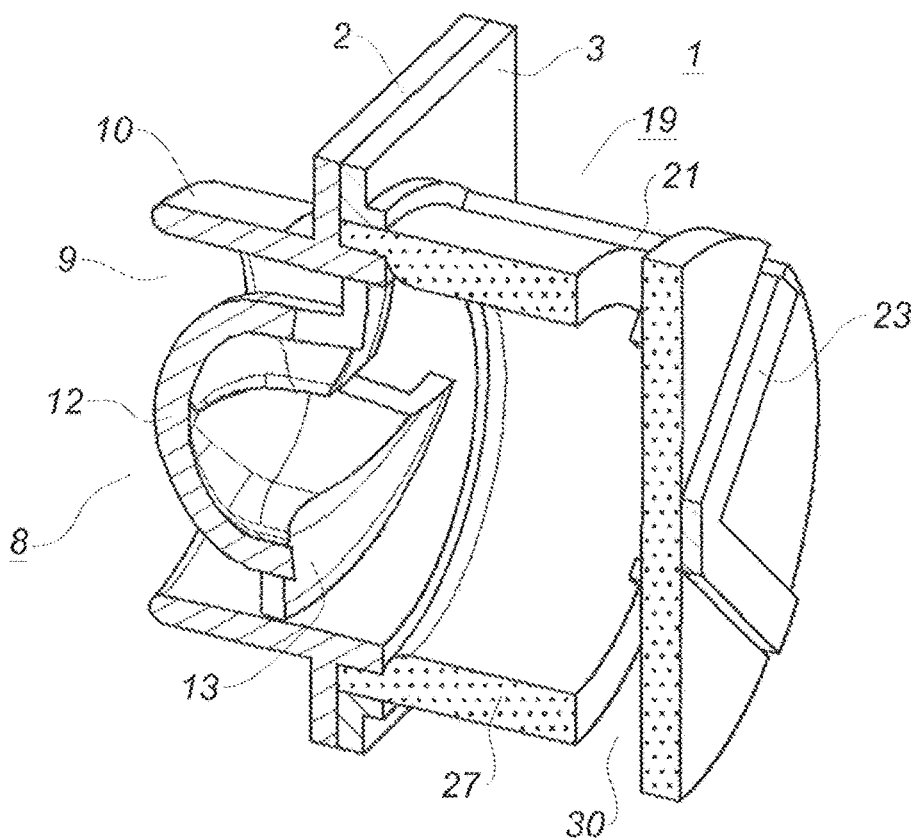
Figure 11:
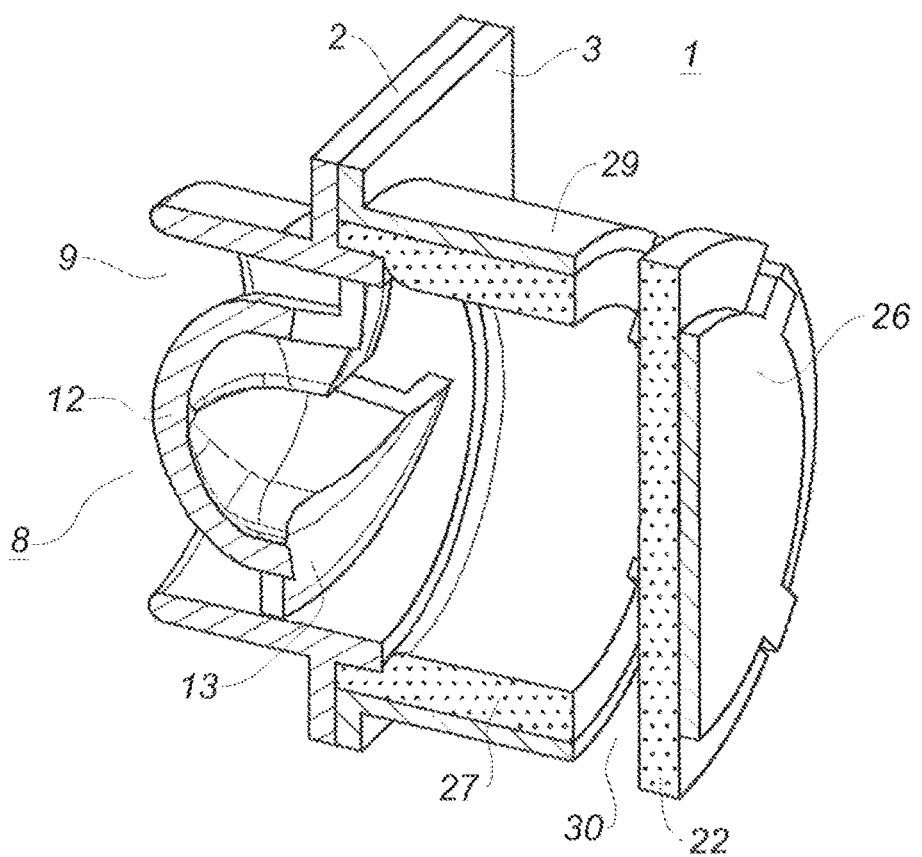

FIGS. 10 and 11 show two variants in which the separation device 1 combines an axial retention media disk 22 and a cylinder of radial retention media 27.

As shown in these figures, the separation device 1 comprises an inlet wall 2 equipped with a helix 8 allowing accelerating and orientating radially the air flow charged with oil droplets.

The retention wall 4 is equipped with an axial retention media disk 22 and a cylinder of radial retention media 27. The cylinder of radial retention media 27 is clamped between a rib coming from the inlet wall 2 and a rib coming from the intermediate wall 4. The axial retention media disk 22 is held at the bottom of the cage 19.

The length of the cylinder of radial retention media 27 is such that a space 30 is formed between the cylinder of radial retention media 27 and the axial retention media disk 22. This space 30 allows the air flow cleared of its oil droplets to escape from the separation device 1.

This embodiment of the invention carries out a combination of a radial retention of the oil droplets which are orientated radially upon leaving the helix 8 and an axial retention of the oil droplets which are accelerated upon leaving the helix.

FIG. 11 is a variant of the separation device 1 of FIG. 9 in which the cage 19 into which the retention media is inserted, is solid and in which the posterior face of the cage is also solid.

The invention is not limited to the embodiments described above by way of non-limiting examples, but it encompasses all embodiments thereof. Thus, it is considered to produce the inlet wall, the retention wall and the intermediate wall separately and to assemble them in a subsequent operation.

The invention claimed is:

1. An oil separation device for separating oil droplets from a gas flow, the device comprising:
   an inlet wall having at least one inlet orifice defined by a cylindrical wall extending away from a first planar surface of the inlet wall;
   a helix disposed within the cylindrical wall, the helix having a central cone from which a plurality of blades extend, the plurality of blades being secured to the cylindrical wall, the helix being configured to accelerate and orientate the gas flow in an axial direction and in a radial direction, and the central cone has an axis parallel to the axial direction;

a retention wall facing a second planar surface of the inlet wall, the second planar surface being opposite to the first planar surface, the retention wall having a recess into which at least one axial retention media is disposed, the at least one axial retention media being configured to collect oil droplets in the gas flow, the retention wall being formed as a single piece with the inlet wall and is secured to a first end of the inlet wall by a hinge such that the retention wall is movable between a first position and a second position, the retention wall facing the second planar surface when the retention wall is in the second position;

an intermediate wall formed as a single piece with the inlet wall, the intermediate wall being movably secured to a second end of the inlet wall by a hinge, the second end being opposite to the first end of the inlet wall, such that the intermediate wall is movable between a first position and a second position, the intermediate wall facing the second planar surface of the inlet wall when it is in the second position and the intermediate wall being located between the retention wall and the inlet wall when the intermediate wall is in the second position and the retention wall is in the second position, the intermediate wall having openings aligned with the helix to direct the gas flow towards the at least one axial retention media when the intermediate wall is in the second position, wherein the inlet wall has pins that are inserted into bores of the intermediate wall when the intermediate wall is in the second position.

2. The separation device according to claim 1, wherein the hinge securing the retention wall to the first end of the inlet wall is configured to maintain the retention wall in a facing spaced relationship with regard to the inlet wall when the retention wall is in the second position.

3. The separation device according to claim 1, wherein the retention wall is solid.

4. The separation device according to claim 1, further comprising an intermediate wall formed as a single piece with the inlet wall, the intermediate wall being movably secured to a second end of the inlet wall by a hinge, the second end being opposite to the first end of the inlet wall, such that the intermediate wall is movable between a first position and a second position, the intermediate wall facing the second planar surface of the inlet wall when it is in the second position and the intermediate wall being located between the retention wall and the inlet wall when the intermediate wall is in the second position and the retention wall is in the second position, the intermediate wall having openings aligned with the helix to direct the gas flow towards the retention media when the intermediate wall is in the second position.

5. An oil separation device for separating oil droplets from a gas flow, the device comprising:

an inlet wall having at least one inlet orifice each being defined by a cylindrical wall extending away from a first surface of the inlet wall and a second surface of the inlet wall, the second surface being opposite to the first surface, the cylindrical wall having a helix disposed within the cylindrical wall, the helix having a central cone from which a plurality of blades extend, the plurality of blades being secured to the cylindrical wall, the helix being configured to accelerate and orientate the gas flow in an axial direction and in a radial direction, and the central cone has an axis parallel to the axial direction;

a retention wall secured to the inlet wall and facing the second surface of the inlet wall, the retention wall having a structure configured to locate at least one axial retention media and/or at least one radial retention media proximate to the cylindrical wall that extends from the second surface when the retention wall is secured to the inlet wall and facing the second surface, the at least one axial retention media and/or the at least one radial retention media being configured to collect oil droplets in the gas flow when the retention wall is secured to the inlet wall, wherein the structure comprises a rib and a cage, the rib cooperating with the cylindrical wall that extends away from the second surface of the inlet wall.

6. The oil separation device as in claim 5, wherein the rib secures the at least one radial retention media between the cylindrical wall that extends away from the second surface of the inlet wall and the rib.

7. The oil separation device as in claim 5, wherein the rib is a cylinder, the cylinder securing the at least one radial retention media between the cylindrical wall that extends away from the second surface of the inlet wall and the cylinder.

8. The oil separation device as in claim 5, wherein the rib secures the at least one radial retention media between the cylindrical wall that extends away from the second surface of the inlet wall and the rib and the cage locating the at least one axial retention media in a facing spaced relationship with respect to the helix.

9. The oil separation device as in claim 8, wherein a space for air flow is provided between the at least one radial retention media and the at least one axial retention media.

10. An oil separation device for separating oil droplets from a gas flow, the device comprising:

an inlet wall having at least one inlet orifice each being defined by a cylindrical wall extending away from a first surface of the inlet wall and a second surface of the inlet wall, the second surface being opposite to the first surface, the cylindrical wall having a helix disposed within the cylindrical wall, the helix having a central cone from which a plurality of blades extend, the plurality of blades being secured to the cylindrical wall, the helix being configured to accelerate and orientate the gas flow in an axial direction and in a radial direction, and the central cone has an axis parallel to the axial direction;

a retention wall secured to the inlet wall and facing the second surface of the inlet wall, the retention wall having a structure configured to locate at least one axial retention media and/or at least one radial retention media proximate to the cylindrical wall that extends from the second surface when the retention wall is secured to the inlet wall and facing the second surface, the at least one axial retention media and/or the at least one radial retention media being configured to collect oil droplets in the gas flow when the retention wall is secured to the inlet wall, wherein the structure comprises a cage, the cage locating the at least one axial retention media in a facing spaced relationship with respect to the helix.

* * * * *